United States Patent
Min et al.

(10) Patent No.: US 9,357,611 B2
(45) Date of Patent: May 31, 2016

(54) LIGHT EMITTING DIODE DRIVER APPARATUS

(71) Applicant: MagnaChip Semiconductor, Ltd., Cheongju-si (KR)

(72) Inventors: Junsik (Samuel) Min, Cheongju-si (KR); Tae Kyoung Kang, Cheongju-si (KR); Juseon (Julie) Jang, Cheongju-si (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 297 days.

(21) Appl. No.: 13/875,834

(22) Filed: May 2, 2013

(65) Prior Publication Data

US 2013/0293133 A1 Nov. 7, 2013

(30) Foreign Application Priority Data

May 4, 2012 (KR) .......................... 10-2012-0047734

(51) Int. Cl.
*H05B 33/08* (2006.01)
*G09G 3/34* (2006.01)

(52) U.S. Cl.
CPC .......... *H05B 33/0884* (2013.01); *G09G 3/3406* (2013.01); *G09G 2320/041* (2013.01); *G09G 2320/0633* (2013.01); *G09G 2320/0666* (2013.01)

(58) Field of Classification Search
None
See application file for complete search history.

(56) References Cited

U.S. PATENT DOCUMENTS

| 2009/0302776 A1* | 12/2009 | Szczeszynski ................ 315/246 |
| 2010/0148679 A1* | 6/2010 | Chen et al. ................ 315/185 R |
| 2012/0086357 A1* | 4/2012 | Tseng ........................... 315/294 |

FOREIGN PATENT DOCUMENTS

| KR | 10-2008-0056618 | 6/2008 |
| TW | 201023682 A1 | 6/2010 |

OTHER PUBLICATIONS

China Office Action issued on Mar. 18, 2016 in counterpart Chinese Application No. 201310160897.X. (14 pages in Chinese).

* cited by examiner

*Primary Examiner* — Long Nguyen (57) ABSTRACT

A light emitting diode (LED) driver apparatus includes a pulse-width modulation (PWM) signal generator configured to generate a PWM signal according to a reference voltage. The LED driver apparatus also includes a DC-DC converter configured to provide a driving voltage to LED arrays based on the generated PWM signal, and a LED driver configured to drive the LED arrays through output ports. The LED apparatus includes a detector configured to detect whether the LED arrays are operatively connected to the corresponding output ports.

19 Claims, 6 Drawing Sheets

LIGHT EMITTING DIODE DRIVER APPARATUS

CROSS-REFERENCE TO RELATED APPLICATIONS

This application claims priority from Korean Patent Application No. 10-2012-0047734, filed on May 4, 2012, in the Korean Intellectual Property Office, the disclosure of which is incorporated herein by reference in its entirety.

BACKGROUND

1. Field

The following description relates to a an apparatus to drive a light emitting diode (LED), and more particularly, to an LED driver apparatus enabled to detect whether LED arrays are connected to output ports to drive the LED arrays.

2. Description of the Related Art

A liquid crystal display (LCD) is widely used to display arbitrary images (as in a general-purpose computer display) or fixed images which can be displayed or hidden, such as preset words, digits, and 7-segment displays as in a digital clock. LCD has advantageous properties, such as thinner thickness, lighter weight, need for less driving voltage and also less consumption of electricity. However, because the LCD is non-light emitting diode which does not illuminate itself, the LCD needs a separate backlighting to supply light onto the LCD panel.

A backlight source such as cold cathode fluorescent lamp (CCFL) or light emitting diode (LED) is generally used for the LCD. The CCFL, which uses mercury, is slow in response, provides poor color representation, and may contribute to air pollution. Also, CCFL may not suitable for the LCD considering the demands for the LCD panel for thinner and smaller device.

In contrast, the LED does not use environmentally hazardous material and, thus, is environmentally friendly, and can be driven by impulse driving. In addition, LED provides good color representation, is capable of arbitrarily changing brightness, and color temperature by adjusting an amount of light of red, green, blue LEDs, and is suitable to achieve thinner and smaller LCD panels. Accordingly, LEDs have recently been widely employed as backlight sources of the LCD panels.

To connect the LCD backlight source to LED arrays consisting of a plurality of LEDs, a driving circuit is used to provide constant current to the respective LED arrays, and a dimming circuit is used to arbitrarily adjust brightness and color temperature or temperature compensation.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

In accordance with an embodiment, there is provided a light emitting diode (LED) driver apparatus, including a pulse-width modulation (PWM) signal generator configured to generate a PWM signal according to a reference voltage. The LED apparatus also includes a DC-DC converter configured to provide a driving voltage to LED arrays based on the generated PWM signal, and a LED driver configured to drive the LED arrays through output ports. The LED apparatus includes a detector configured to detect whether the LED arrays are operatively connected to the corresponding output ports.

An output port among the output ports is grounded when the output port is disconnected from an LED array of the LED arrays.

The detector applies a preset amount of voltage to the output ports and detects whether the LED arrays are operatively connected to the output ports, respectively, based on respective voltage values of the output ports.

The detector includes detection circuits corresponding in number to the output ports, wherein each of the detection circuits applies a preset amount of voltage to the output ports, and detects that the LED arrays are disconnected from the output ports when the voltages of the output ports are lower than the preset amount of voltage.

Each of the detection circuits includes a switching unit configured to apply a preset amount of voltage to each output port at a preset time point, a comparator configured to compare the voltage of each output port with the preset voltage, and a latch unit configured to store and output a comparison result from the comparator.

The comparator includes an operational amplifier with a positive terminal operatively connected to each output port and a negative terminal receiving the preset voltage.

The switching unit applies the preset amount of voltage to each output port when at least one of an enable signal to control the LED driver apparatus, an under-voltage lockout (UVLO) signal, and a clock signal is input.

The PWM signal generator generates the reference voltage excluding the forward voltage of an output port of the output ports when the LED array is disconnected from the output port.

The DC-DC converter converts DC voltage based on the PWM signal and outputs a converted DC voltage to the LED arrays.

The LED driver adjusts an amount of the driving current within the LED arrays and provides an adjusted constant current as a driving current to the LED arrays.

The detector includes a connection detector configured to detect whether the output ports are connected to the LED arrays, and an open detector configured to determine whether an open status of the LED arrays exists by detecting forward voltages of the LED arrays.

The connection detector detects whether the LED arrays are operatively connected to corresponding output ports by applying a preset amount of voltage to the output ports and detects whether the output ports are connected to the LED arrays based on the respective voltage values of the output ports.

The PWM generator measures a forward voltage as an output voltage from each output port of the LED arrays.

The reference voltage is a lowest voltage from each of the voltages measured.

In accordance with an embodiment, there is provided a light emitting diode (LED) driver apparatus including a DC-DC converter. The DC-DC converter is configured to convert a voltage based on a PWM signal generated based on a reference voltage and provides the converted voltage as a driving voltage to LED arrays. The LED apparatus also includes a LED driver configured to adjust a size of the driving current within the LED arrays and provide an adjusted constant current as a driving current to the LED arrays. The LED apparatus includes a detector configured to detect whether the LED arrays are operatively connected to corresponding output ports.

Accordingly, an LED driver apparatus, according to various embodiments, can supply a preset voltage to output ports to drive LED arrays, and detect whether or not the LED arrays are connected, by detecting the voltages of the output ports after the supply of the preset voltage.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

An LED driver apparatus can employ a plurality of output ports to control a plurality of LED arrays. In one configuration, the LED driver apparatus is designed to operate normally when the number of LED arrays is equal to the number of control channels. However, the LED driver apparatus operates abnormally if the number of LED arrays connected is less than the number of control channels the LED driving apparatus controls. This will be explained below with reference to FIG. 1.

Figure 1:
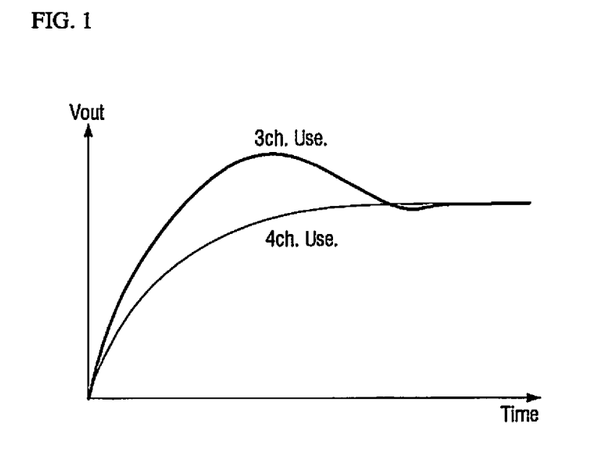
FIG. 1 is a waveform provided to explain operations of an LED driver apparatus.

As illustrated in FIG. 1, when four LED arrays connected to the LED driver apparatus supporting four channels, the LED driver apparatus operates normally. However, when there are three LED arrays connected to the LED driver apparatus supporting four channels, the initial driving voltage would increase as illustrated in FIG. 1. For the fourth channel that is not supported by an LED array, the LED driver apparatus would detect a non-connected output port associated with the fourth channel to be open. Once the open state is detected, the driving voltage increases (FIG. 1). A frequent increase in the driving voltage results in shortening the lifespan of the LED array. Accordingly, in accordance, with an illustrative example, a method is configured that is capable of or enabled to detect a connecting status of LED arrays, rather than using a method to detect whether or not LED arrays are open.

Figure 2:
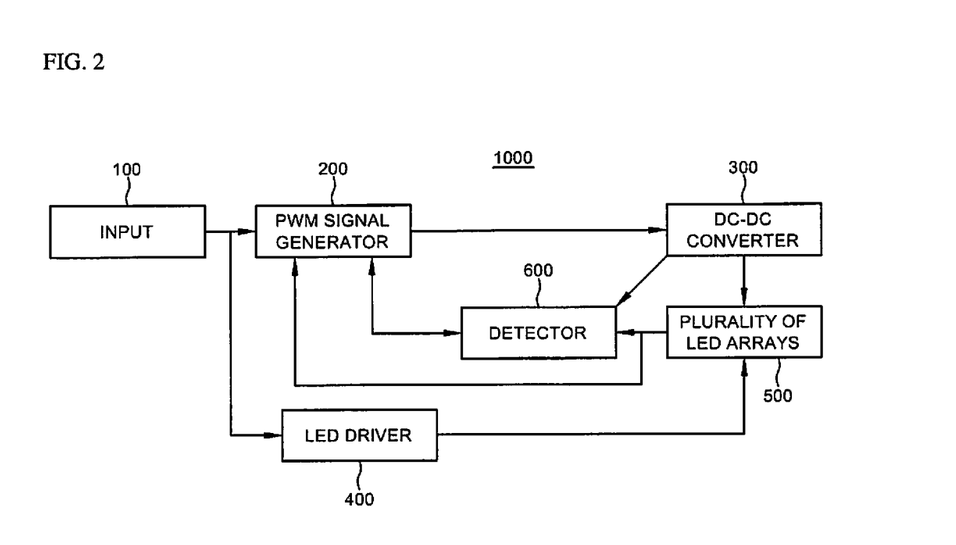
FIG. 2 is a block diagram of a light emitting diode (LED) driver apparatus, according to an embodiment.
Figure 3:
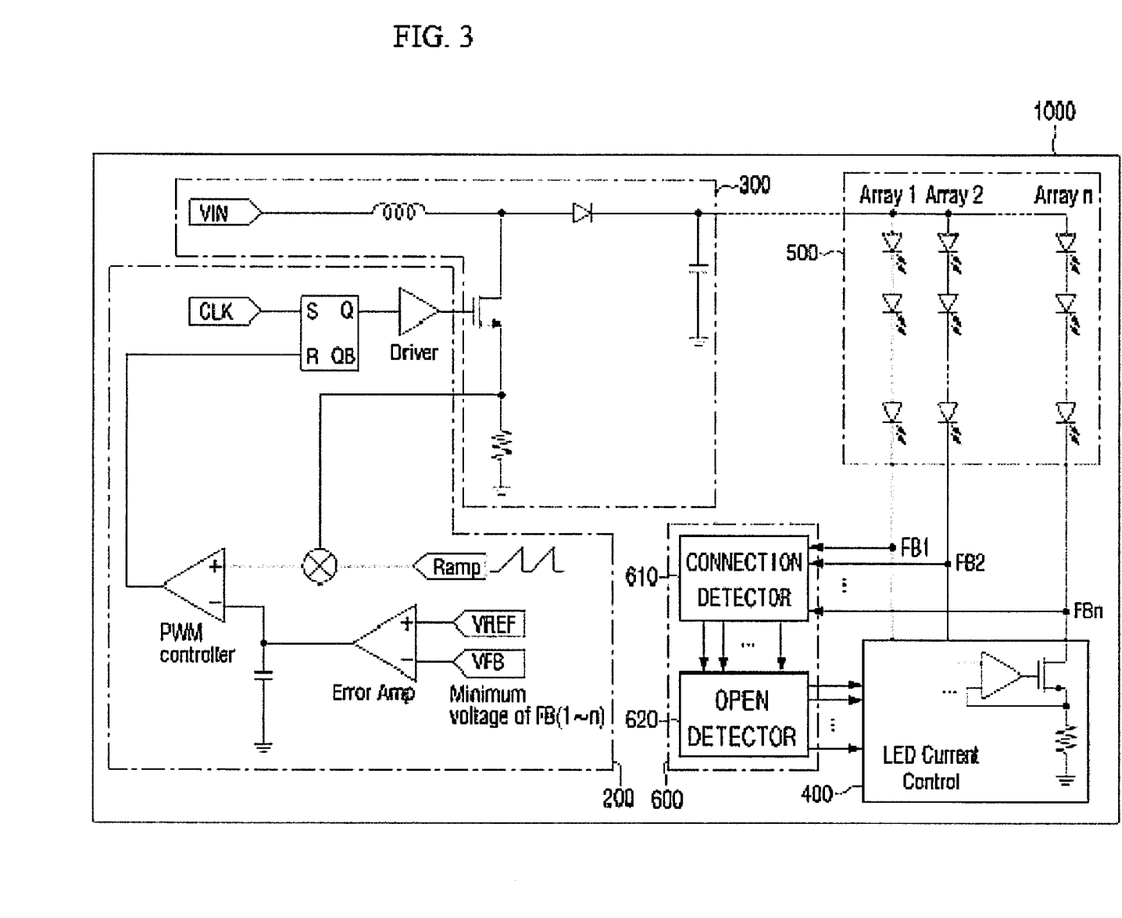
FIG. 3 is a circuit diagram of an LED driver apparatus, according to an embodiment.

FIG. 2 is a block diagram of a light emitting diode (LED) driver apparatus according to an embodiment FIG. 3 is a circuit diagram of an LED driver apparatus according to an embodiment.

Referring to FIGS. 2 and 3, the LED driver apparatus 1000 may include an input 100, a PWM signal generator 200, a DC-DC converter 300, an LED driver 400, a plurality of LED arrays 500, and a detector 600.

The input 100 receives a dimming signal to drive the plurality of LED arrays 500. The 'dimming signal' as used herein refers to a signal to adjust the brightness and color temperature of an LED or to compensate temperature. In one embodiment, the dimming signal may be received from outside, for instance, on a direct mode. However, other embodiments utilizing fixed phase mode and phase shift mode may also be implemented. In one example, a digital dimming of the LED arrays 500 may be categorized largely into a direct mode, a fixed phase mode, and a phase shift mode. In the direct mode, both a PWM frequency and an on-duty signal are controlled externally through, for instance, a controller, a processor, or a PAD. In the fixed phase mode or the phase shift mode, the PWM frequency is internally generated in an integrated circuit (IC) and only the on-duty signal is received from the PAD to control the plurality of LED arrays 500.

The PWM signal generator 200 processes and generates a reference voltage. The PWM signal generator 200 measures a forward voltage as an output voltage from each output port of the plurality of LED arrays 500, and utilizes a lowest voltage, from among the measured forward voltages, to be the reference voltage that corresponds to the plurality of LED arrays 500. Among the measured forward voltages from the plurality of LED arrays 500, the forward voltage corresponding to an output port of at least one of the plurality of LED arrays 500 that is determined to be disconnected or open from the LED array, is excluded from consideration when generating the reference voltage. While the PWM signal generator 200 may generate a reference voltage, in another embodiment, the reference voltage may be generated at the LED driver 400, or at another structural device illustrated in FIG. 2.

The PWM signal generator 200 generates a PWM signal according to the reference voltage. In one configuration, the PWM signal generator 200 generates a PWM signal to control an amount of driving voltage of a DC-DC converter 300 according to the reference voltage generated in the preceding process.

The DC-DC converter 300 may include a transistor to perform switching, and provide driving voltages to the plurality of LED arrays 500 according to the switching operation of the transistor. In one illustrative example, the DC-DC converter 300 converts a DC voltage based on the PWM signal generated at the PWM signal generator 200 and provides the converted DC voltage as a driving voltage to the plurality of LED arrays 500. The DC-DC converter 300 may provide the plurality of LED arrays 500 with voltages corresponding to forward direction bias voltages of the plurality of LED arrays 500 so that the plurality of LEDs 500 operate in a saturation region.

The LED driver 400 drives the plurality of LED arrays 500 through a plurality of output ports. In one example, the LED driver 400 adjusts an amount of the driving current within the plurality of LED arrays 500 and provides an adjusted constant current as a driving current to the plurality of LED arrays 500. The LED driver 400 drives the plurality of LED arrays 500 through the output ports. An output port is grounded when there is no LED array operatively connected to the output port. In one configuration, the connection between the plurality of LED arrays 500 to the output ports is direct or, in the alternative, the connection may be not direct or immediate, but with at least one structural element or device in between the plurality of LED arrays 500 and the output ports, enabling the plurality of LED arrays 500 and the output ports to be connected in operation.

The detector 600 detects whether the plurality of output ports are operatively connected to the LED arrays, and detects whether each of the plurality of LED arrays 500 are open. As shown in FIG. 3, the detector 600 includes a connection detector 610 and an open detector 620.

As shown in FIG. 3, the connection detector 610 detects whether the plurality of output ports are connected to the plurality of LED arrays 500. In order to do so, the connection detector 610 applies a preset amount of voltage to the plurality of output ports and detects whether the plurality of output ports are connected to the LED arrays based on the respective amounts of the voltages of the plurality of output ports. The operation to determine connection to the LED arrays will be explained below with reference to FIGS. 4 to 6.

The open detector 620 determines whether the plurality of LED arrays 500 is open. In one example, the open detector 620 detects whether an open status of the plurality of LED arrays 500 exists by detecting forward voltages of the plurality of LED arrays 500.

In one illustrative configuration, although the detector 600 may determine whether the plurality of LED arrays is connected and whether these are open, alternative embodiments are possible. For instance, the detector 600 may be implemented for the purpose of detecting connection and open status of one LED array. Further, although the detector 600 may detect the connection and open statuses of the LED arrays in the embodiment illustrated and explained above, in accordance with one example, the detector 600 may be designed to only detect the connection status of the LED arrays.

In some embodiments, the LED driver apparatus 100 detects whether the LED arrays are connected to the output ports by supplying at least one preset voltage to output ports to drive the plurality of LED arrays 500. The LED driver apparatus 100 detects voltage values at the output ports after the at least one preset voltage is supplied.

Although the LED driver apparatus 1000 may include a plurality of LED arrays 500 as in the embodiments explained above, alternative embodiments are possible. For example, the LED driver apparatus 1000 may exclude the plurality of LED arrays 500. In this case, the PWM signal generator 200, the DC-DC converter 300, the LED driver 400 and the detector 600 may be integrated into one single integrated chip to control a plurality of LED arrays. Alternatively, the LED driver apparatus 1000 may exclude the PWM signal generator 200 and/or the plurality of LED arrays 500. In this case, the DC-DC converter 300, the LED driver 400 and the detector 600 may be integrated into one single integrated chip to control the LED arrays 500.

Figure 4:
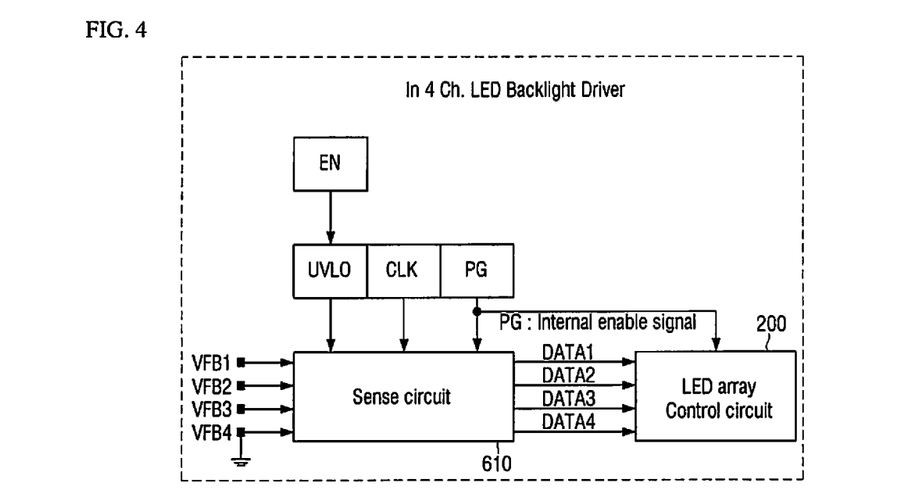
FIG. 4 is a view provided to explain operations of a connection detector of FIG. 2 in detail.
Figure 5:
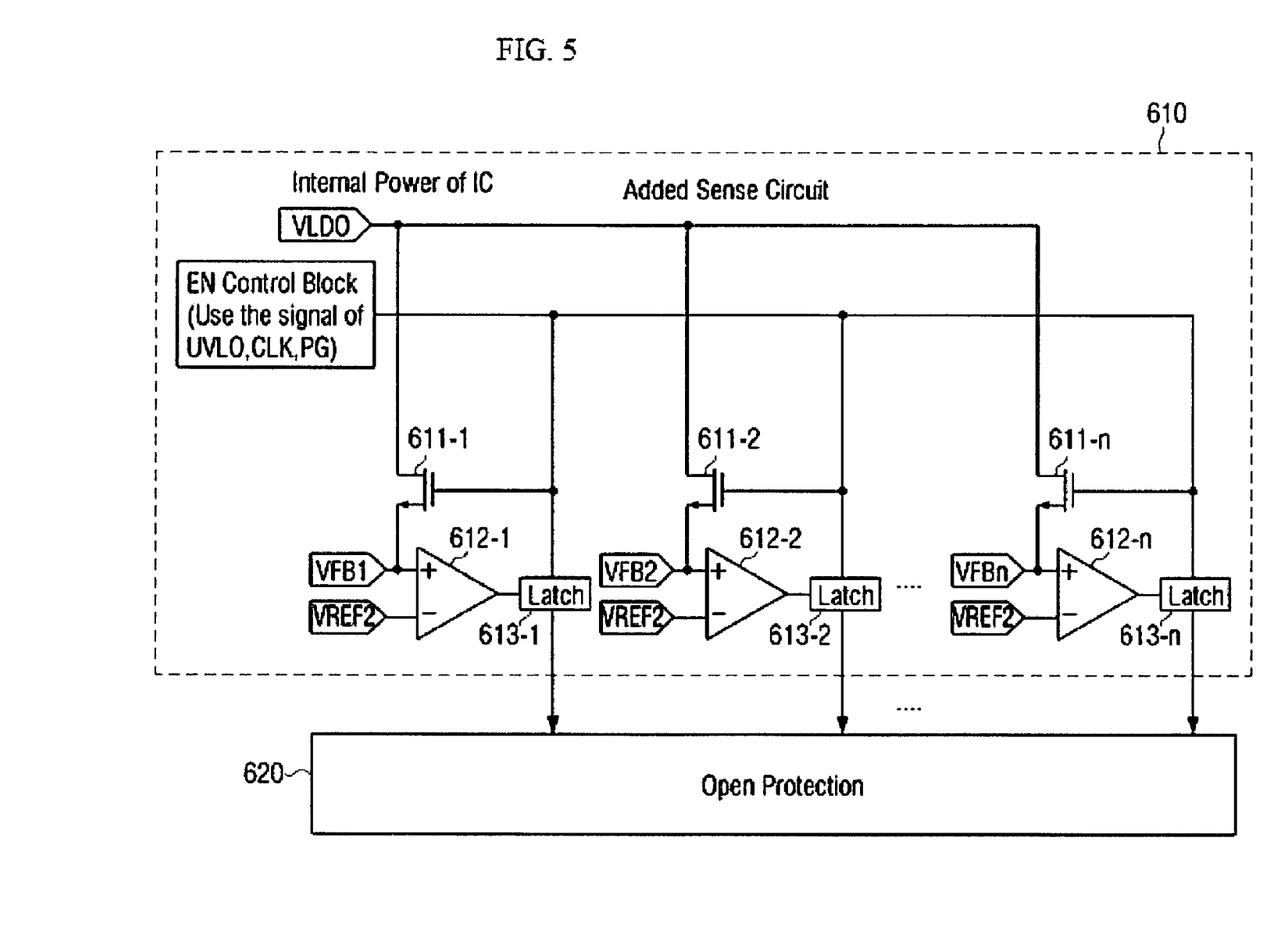
FIG. 5 is a detailed circuit diagram of the connection detector of FIG. 2.

FIG. 4 is a view provided to explain operations of a connection detector of FIG. 2 in detail. FIG. 5 is a detailed circuit diagram of the connection detector of FIG. 2.

Referring to FIGS. 4 and 5, the connection detector 610 may be connected to a plurality of output ports and provide the PWM signal generator 200 with information regarding whether the LED arrays are connected to the plurality of output ports. To be specific, the connection detector 610 includes a plurality of detection circuits corresponding in number to the output ports. Each detection circuit applies a preset amount of voltage to the output port and detects that the LED array is not connected to the output port when the voltage at the output port is lower than the preset amount of voltage. As shown in FIG. 5, the detection circuits in the connection detector 610 may include a switching unit 611-1 to 611-*n*, a comparator 612-1 to 612-*n*, and a latch unit 613-1 to 613-*n*.

The switching unit 611-1 to 611-*n* applies a preset amount of voltage to the output port at a preset time point. The switching unit 611-1 to 611-*n* may be designed so that a source receives a preset voltage, and a gate receives at least one enable signal to control the LED driver apparatus. An under-voltage lockout (UVLO) signal, a clock signal, and a power good (PG) signal, and a drain may be connected to the output port. The switching unit 611-1 to 611-*n* may be designed to be P type MOS transistors connected to the output port.

The comparator 612-1 to 612-*n* compares the voltage of the output port with a preset voltage, and outputs a comparison result. In one example, the comparator 612 may be an operational amplifier (OP-AMP) in which a positive terminal is connected to the output port and a negative terminal receives a preset voltage so that the OP-AMP amplifies a difference and outputs an amplified result.

The latch unit 613 stores the amplified result output at the comparator 612-1 to 612-*n* and outputs the same. That is, the latch unit 613 may store the amplified result output from the comparator 612, that is, whether the plurality of LED arrays 500 are connected to the output ports, and provide the amplified result to the open detector 620 or to another structural element within the LED driver apparatus.

Figure 6:
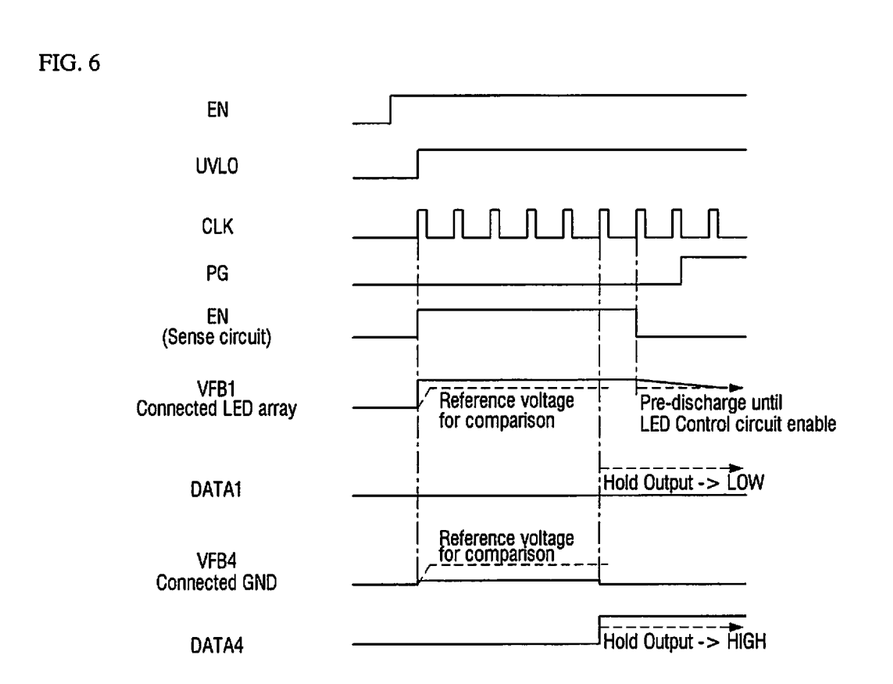
FIG. 6 is a waveform provided to explain operations of the connection detector of FIG. 2 in detail.

FIG. 6 is a waveform provided to explain operations of the connection detector of FIG. 2 in detail.

Referring to FIG. 6, when an enable signal is input, power is supplied into the LED driver apparatus, and when power supply is input in a normal condition, an undervoltage-lockout (UVLO) signal is on.

With the UVLO signal being on, an enable signal to initiate the operation of the connection detector 610 is input, where the connection detector 610 inputs a preset power to each of the plurality of output ports. The connection detector 610 detects whether the LED arrays are connected by detecting an amount of power at the output ports. Furthermore, in the embodiment as illustrated, the first to third output ports are connected to the LED array, while the fourth output port is grounded.

Accordingly, when voltage is supplied to the first to third output ports, voltages are maintained above a preset amount. In other words, an LED array and a switching element of the LED driver driving the LED array are connected to the corresponding output port. The corresponding port is maintained under a preset amount of voltage due to the switching element of the LED driver. The connection detector 610 may find whether the LED arrays are connected to the first to third output ports and output data indicative thereof notifying a connection status.

On the contrary, the voltage of the fourth output port, which is grounded, is lower than the preset amount. That is, the fourth output port is grounded and connected to a switching element of the LED driver to drive the corresponding output port. Due to an electric current path formed between a preset power and the ground, the fourth output port is maintained under the preset amount of voltage. Accordingly, the connection detector 610 confirms that the LED array is not connected to the fourth output port. As shown in FIG. 6, the connection detector 610 may output data to notify that the LED array is not connected to the corresponding port.

In one illustrative example, although the connection detector 610 detects the connection status of the LED array to the four output ports as explained above, alternative embodiments are possible. For instance, five LED arrays may be connected to the LED driver apparatus, in which case the connection detector 610 may detect whether the LED arrays are connected to the five output ports, respectively. In yet another embodiment, connection of LED arrays to three or less output ports may be detected.

The PWM signal generator 200, the DC-DC converter 300, the detector 600, and the LED driver 400, the switching unit 611-1 to 611-$n$, the comparator 612-1 to 612-$n$, and the latch unit 613-1 to 613-$n$ described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

The foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims.

What is claimed is:

1. A light emitting diode (LED) driver apparatus, comprising:
    a pulse-width modulation (PWM) signal generator configured to generate a PWM signal according to a reference voltage;
    a DC-DC converter configured to provide a driving voltage to LED arrays based on the generated PWM signal;
    a LED driver configured to drive the LED arrays through output ports; and
    a detector configured to detect whether the LED arrays are operatively connected to the corresponding output ports based on respective voltages of the output ports being different from a preset amount of voltage.

2. The LED driver apparatus of claim 1, wherein an output port among the output ports is grounded when the output port is disconnected from an LED array of the LED arrays.

3. The LED driver apparatus of claim 2, wherein the detector applies the preset amount of voltage to the output ports and detects whether the LED arrays are operatively connected to the output ports, respectively, based on respective voltage values of the output ports.

4. The LED driver apparatus of claim 1, wherein the detector comprises detection circuits corresponding in number to the output ports, wherein each of the detection circuits applies the preset amount of voltage to the output ports, and detects that the LED arrays are disconnected from the output ports when the voltages of the output ports are lower than the preset amount of voltage.

5. The LED driver apparatus of claim 4, wherein each of the detection circuits comprises:
    a switching unit configured to apply a preset voltage to each output port at a preset time point;
    a comparator configured to compare the voltage of each output port with the preset amount of voltage; and
    a latch unit configured to store and output a comparison result from the comparator.

6. The LED driver apparatus of claim 5, wherein the comparator comprises an operational amplifier with a positive terminal operatively connected to each output port and a negative terminal receiving the preset amount of voltage.

7. The LED driver apparatus of claim 5, wherein the switching unit applies the preset voltage to each output port when at least one of an enable signal to control the LED driver apparatus, an under-voltage lockout (UVLO) signal, and a clock signal is input.

8. The LED driver apparatus of claim 1, wherein the PWM signal generator generates the reference voltage excluding the forward voltage of an output port of the output ports when the LED array is disconnected from the output port.

9. The LED driver apparatus of claim 1, wherein the DC-DC converter converts DC voltage based on the PWM signal and outputs a converted DC voltage to the LED arrays.

10. The LED driver apparatus of claim 1, wherein the LED driver adjusts an amount of the driving current within the LED arrays and provides an adjusted constant current as a driving current to the LED arrays.

11. The LED driver apparatus of claim 1, wherein the detector comprises
    a connection detector configured to detect whether the output ports are connected to the LED arrays; and
    an open detector configured to determine whether an open status of the LED arrays exists by detecting forward voltages of the LED arrays.

12. The LED driver apparatus of claim 11, wherein the connection detector detects whether the LED arrays are operatively connected to corresponding output ports by applying the preset amount of voltage to the output ports and detects whether the output ports are connected to the LED arrays based on the respective voltage values of the output ports.

13. The LED driver apparatus of claim 1, wherein the PWM generator measures a forward voltage as an output voltage from each output port of the LED arrays.

14. The LED driver apparatus of claim 1, wherein the reference voltage is a lowest voltage from each of the voltages measured.

15. A light emitting diode (LED) driver apparatus, comprising:
    a DC-DC converter configured to convert a voltage based on a PWM signal generated based on a reference voltage and provide the converted voltage as a driving voltage to LED arrays;
    a LED driver configured to adjust a size of the driving current within the LED arrays and provide an adjusted constant current as a driving current to the LED arrays; and
    a detector configured to detect whether the LED arrays are operatively connected to corresponding output ports based on respective voltages of the output ports being different from a preset amount of voltage.

16. The LED driver apparatus of claim 15, wherein the detector comprises detection circuits corresponding in number to the output ports, wherein each of the detection circuits applies the preset amount of voltage to the output ports, and detects that the LED arrays are disconnected from the output ports when the voltages of the output ports are lower than the preset amount of voltage.

17. The LED driver apparatus of claim 16, wherein each of the detection circuits comprises:
   a switching unit configured to apply a preset voltage to each output port at a preset time point;
   a comparator configured to compare the voltage of each output port with the preset amount of voltage; and
   a latch unit configured to store and output a comparison result from the comparator.

18. The LED driver apparatus of claim 17, wherein the comparator comprises an operational amplifier with a positive terminal operatively connected to each output port and a negative terminal receiving the preset amount of voltage.

19. The LED driver apparatus of claim 17, wherein the switching unit applies the preset voltage to each output port when at least one of an enable signal to control the LED driver apparatus, an under-voltage lockout (UVLO) signal, and a clock signal is input.

* * * * *